Jan. 20, 1942.     H. M. KECKLEY     2,270,591
AUTOMATIC COMPUTING AND BILLING METER ATTACHMENT
Filed Oct. 29, 1938     2 Sheets-Sheet 1
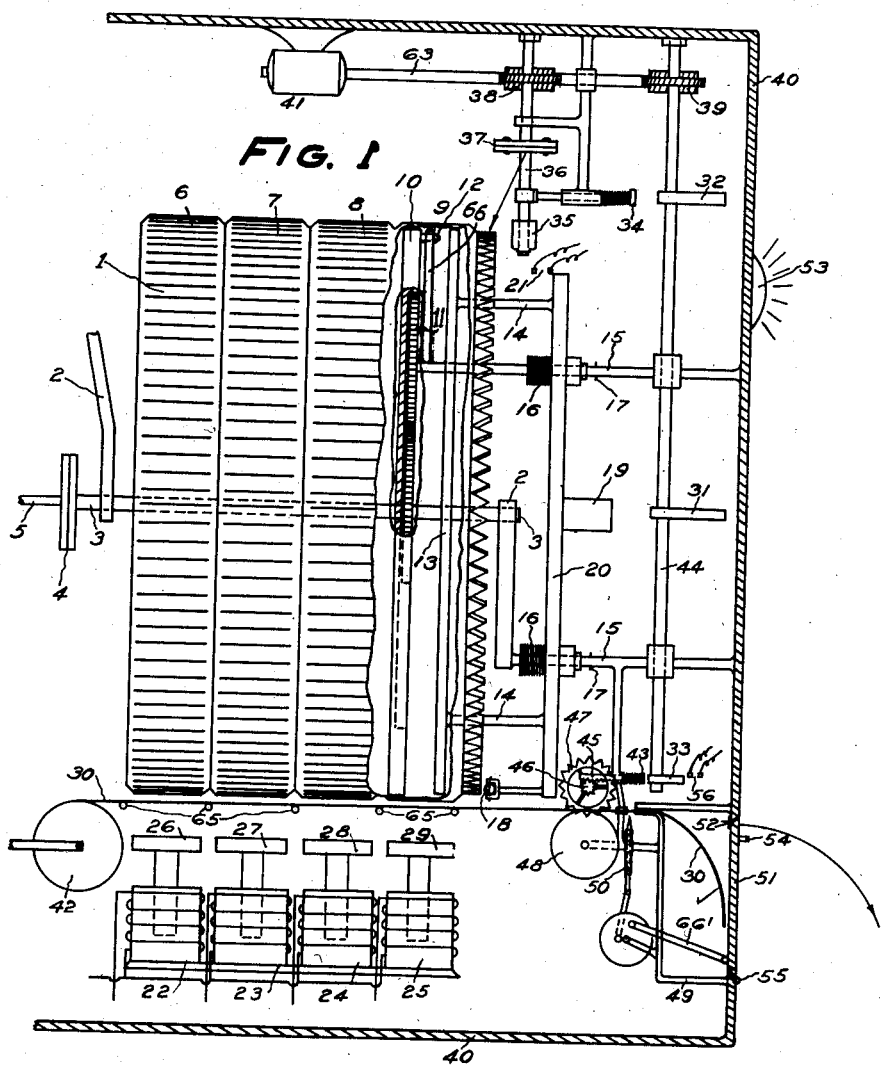
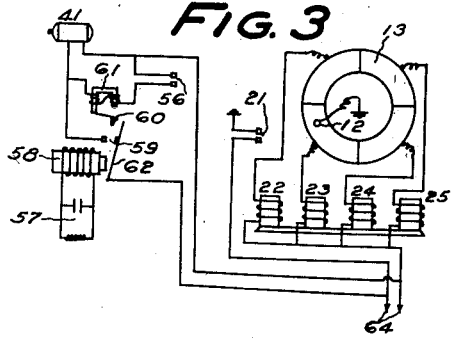
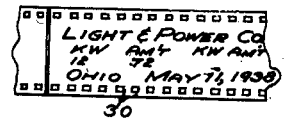
Inventor
Harold M. Keckley.

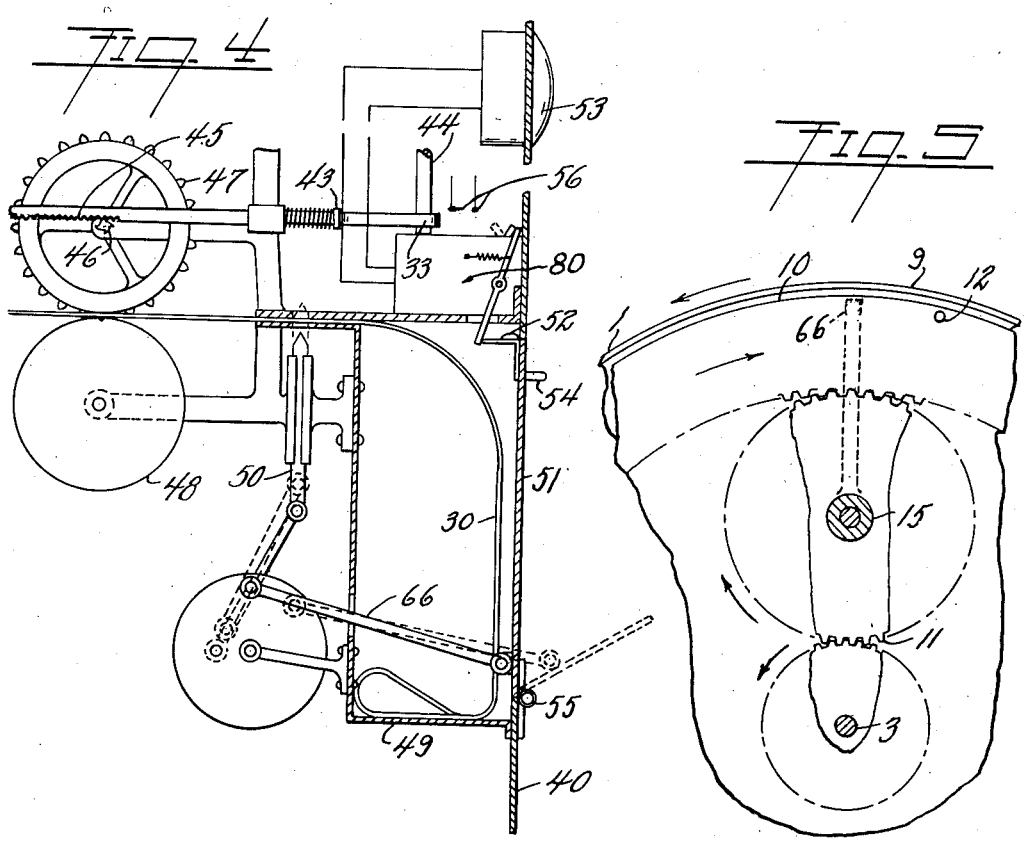
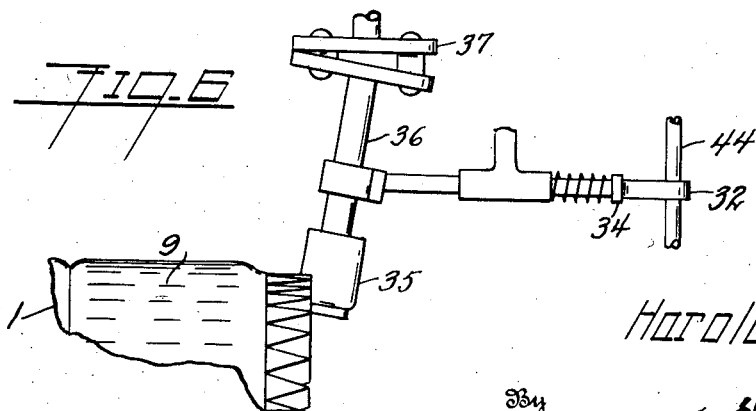

Patented Jan. 20, 1942

2,270,591

UNITED STATES PATENT OFFICE 2,270,591

AUTOMATIC COMPUTING AND BILLING METER ATTACHMENT

Harold Martin Keckley, Fort Jennings, Ohio

Application October 29, 1938, Serial No. 237,790

1 Claim. (Cl. 234—58)

This invention relates to rendering pre-computed bills to customers supplied from meter service, and this may be incorporated in a new meter with the housing adapted thereto or as an attachment for meters in service. The attachment embodiment such as herein disclosed has connection to a dial shaft of the meter. In electric meters this may be to the hundreds dial shaft of a kilowatt hour meter. The attachment includes marking elements assembled to be driven from such shaft. A mark receiving strip or tape is in position to register for a marking, controlled from the office of the central station for the supply of electric service. One at the central station may operate a convenient control to produce the marked strip described more in detail hereinafter. There is thus available for the customer at the customer's meter a pre-computed bill for the service rendered. At the end of the marking operation the control effecting the marking re-sets the marking elements so that a subsequent meter reading operation may be had for subsequent billing. The consumption during the next period is the indication effected by the subsequent billing.

Referring to the drawings:

Fig. 1 is a view, with parts broken away, of the computed billing marker drum, its mark receiving tape and electric controls incidental to the functioning thereof;

Fig. 2 is a fragment of the tape showing consumption marking thereon;

Fig. 3 is a wiring diagram of controls for the indexing, marking and resetting;

Fig. 4 is a detail of parts for delivery of the computed bill;

Fig. 5 shows the drive for the ring which carries the segments; and

Fig. 6 shows the reset drive connection for the drum.

The drive for the marker drum

In the instance the device herein shown be connected to a kilowatt hour meter, 100 kilowatt hour shaft 5 of such meter is, through friction clutch 4, effective to drive shaft 3, this shaft being in alignment with the shaft 5. This shaft 3 is mounted in bearings 2 and therebetween has fixed thereto drum 1. Herein this drum 1 is shown as having notation carrying lanes or rows 6, 7, 8 and 9. These respective lanes embody embossing sections or means. An overhang from this drum 1, remote from the clutch 4, is of crown tooth formation. Accordingly, in the normal functioning of the kilowatt hour meter the shaft 5 effects the driving of the drum 1 therewith.

The tape mounting

In housing 40 for the drum 1 there is located roll 42 of tape 30 having parallel perforations near the opposite edges thereof. This tape passes from the roll 42 over guides 65 in proximity to the drum 1. This reach of the tape 30 is accordingly parallel to the axis of the shaft 3 in transit direct to a rubber surfaced roller 48 with which contacts large tooth-carrying roller 47. The teeth of this roller 47 mesh or enter the openings in the tape 30 and thus insure positive measured feed of this tape.

The tape feed

In the housing 40 is motor 41 effective through shaft 63 and speed reduction gearing 39 to rotate the shaft 44 and through cam device 33 act against the plunger 43, whereby such plunger may operate through its rack 45 on pinion 46 which has a ratchet or one-way drive connection (not shown) to rotate this large tooth-carrying wheel 47 and thus feed or draw the tape 30 along the reach from the roll 42 to the roll 48 and deliver the tape past the knife 50 into the compartment 49 of the housing 40. This compartment 49 is normally closed by a door 51 held by latch 52 and having hinge 55 and handle 54 (Figs. 1, 4).

Indexing

Remote from the meter, at the central station, the power company representative may on occasions, say a certain day of the month, impose upon the power circuit 64 a frequency higher than that normally in the circuit. In practice, this power supply circuit may be 25 or 60 cycle, and the frequency would therefore be higher than 25 or 60 cycle. This high frequency is imposed upon a circuit 57 tuned thereto located at the meter and is effective to energize solenoid 58. This solenoid, when energized, operates armature 62 to close contact 59, thereby completing a power circuit to the motor 41. This motor 41 is effective through the shaft 63, the gearing 39, and the shaft 44 to operate a cam 31. The cam 31 operates effectively in advance of the cam 33 as described for the feed of the tape. This cam 31 acts upon projection 19. This projection 19 extends from an upright 20, which is a slide controlled in its movement by parallel guides 15 secured to the housing 40. This shifting of the upright 20 away from stops 17 and against the resistance of springs 16 brings its lower portion which has a clevis mounting a roller 18 to force such roller 18 into the crown tooth portion of the drum 1. In the instance herein shown there may be in each row on the drum 1 a series of one hundred embossed notations. These may mean for the lane 6 from 1 to 100 kilowatts; for the lane 7, from 101 to 200 kilowatts; for the lane 8, from 201 to 300 kilowatts; and for the lane 9, from 301 to 400 kilowatts. Accordingly, with the crown gear having a like number of teeth, the thrusting of the roller 18 is effective to bring a notation into register position. This roller 18 when thrust into the crown teeth will hold the drum against movement or will index the same. This indexing rotation of the drum is permitted due to the friction clutch 4.

Marking

The shifting of this upright 20, in bringing about the indexing and holding of the drum 1, simultaneously closes contacts 21, thereby controlling the supply of current for the marking operation. Due to the fact that more than one notation lane is provided and it is desired to obtain impression from but a single pre-computation, there is care taken of this four lane device by a four to one speed reduction through gearing 11 (Fig. 5) from the shaft 3 to the driven ring or loose gear 10. This gear 10 carries a contact pin 12. The upright 20 has extending therefrom arms 14 carrying ring 13 of four segments, one corresponding to each of the respective lanes 6, 7, 8 and 9. These quadrants are insulated from each other and are thrust with the upright 20 to close with the contact 12, thus completing a circuit through one of the solenoids 22 to 25. In so doing, there is thus an automatic selection of the particular lane computation associated with the solenoid to be operated. These solenoids operate hammers 26 to 29. Each of these segments from the segment ring 13 has connection to one of these solenoids, as for example, the solenoid 22 having the hammer 26, which, when energized, thrusts its hammer 26 toward the drum 1 and is thereby effective at the lane 6 to effect stenciling, embossing, or marking on the tape 30. In the event the position of the circuit completing contact 12 be on the segment for the lane 7, then solenoid 23 is energized and hammer 27 is operated. With the circuit completing contact 12 to segment 13 in circuit with the solenoid 24, the hammer 28 is operated. Likewise, if the meter be for an excess of 300 kilowatt hours, then the contact 12 closes the circuit for a segment of the ring 13 to energize the solenoid 25 and thereby operate the hammer 29 to emboss or mark the tape 30 with an amount in excess of 300 for the pre-computed billing. This tape 30 may, in addition to this pre-computed stenciling, embossing, or marking, have notation therealong of the name of the power company and even the date as shown in Fig. 2. As pointed out, the feeding may now be effective through the operation of the cam 33 for delivering the marked portion of the tape into the compartment 49.

Reset

The shaft 44, in addition to the cams 31 and 33, has a cam 32. This cam 32 is effective after the marking operation to act upon plunger 34 (Fig. 6) and thereby, due to the yield of flexible coupling 37, shift the yieldable or rubber roller 35 into the line indicated by the arrow (Fig. 1) into driving relationship with the crown gear on the drum 1. The motor 41 is effective to drive this roller 35 through the shaft 63, gearing 38, and shaft 36. By means of the gearing 38, the shaft 36 will complete a large number of revolutions while the shaft 44 is completing only one, thereby completely returning the drum to its original position. The direction of this rotation is to return the drum 1 from the position at which the marking occurred to zero or starting position, and, as the drum 1 reaches such position, the contact 12 abuts fixed stop 66 mounted on member 15. In the event there be further rotation of the shaft 36, the roller 35 will slip on shaft 36 during further operation of the motor 41. The roller 35 is frictionally mounted on the shaft 36 and the friction is such that it will overcome the friction of the clutch 4, thus permitting resetting of the drum.

Cut-out

As this operation is completed for the indexing, impression obtaining or marking, and reset, there is effected cutting out of the motor 41 by the cam 33, then acting through the contacts 56 and electromagnet 61. The armature 60 releases the armature 62, breaking the circuit to the motor 41 at the contacts 59, and the motor 41 is stopped.

Incidental to this completion of the billing operation, a switch 80 (Fig. 4) may be operated by the cam 33 to turn on neon bulb 53 to signal the customer.

The completed bill

The customer, to obtain the bill, grasps handle 54 to swing the door 51 on its hinge 55 to gain access to the compartment 49. This operation of the door 51 is effective through link 66 to operate cutter 50 to sever a section of the tape and thereby render available, in the compartment 49 to the customer, a pre-computed bill according to the meter operation. Upon closing the door 51, the switch 80 is reset to cut-out the light 53.

A succeeding period or interval for billing merely requires the central station again to bring into operation the tuned circuit for effecting indexing position for the drum so that, in the automatic functioning following, a solenoid may operate its hammer to impress on the tape 30 in accordance with the particular computed impression to be taken from the drum. As the hammer is retracted, the feeding of the marked tape is effected. Following the marking, there is a reset or reverse winding to bring the drum back to starting position for a subsequent operation.

I claim:

A billing device for metered service comprising a rotatable drum having a plurality of rows of printing characters representing pre-computed notations disposed around its periphery, means for rotating said drum in accordance with the operation of a meter, a plurality of impression taking means, one co-operating with each row of characters on the drum, means governed by the position of the drum for selectively rendering one only of said impression-taking means operable and means for operating said impression taking means.

HAROLD MARTIN KECKLEY.